(12) United States Patent
Poler et al.

(10) Patent No.: US 12,434,232 B2
(45) Date of Patent: Oct. 7, 2025

(54) SEPARATION MEDIA, DEVICES AND APPLICATIONS THEREOF

(71) Applicant: THE UNIVERSITY OF NORTH CAROLINA AT CHARLOTTE, Charlotte, NC (US)

(72) Inventors: Jordan Poler, Charlotte, NC (US); James E. Amburgey, Kannapolis, NC (US); Abhispa Sahu, Charlotte, NC (US); Tim B. Eldred, Raleigh, NC (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 0 days.

(21) Appl. No.: 18/928,603

(22) Filed: Oct. 28, 2024

(65) Prior Publication Data

US 2025/0050324 A1 Feb. 13, 2025

Related U.S. Application Data

(63) Continuation of application No. 16/768,344, filed as application No. PCT/US2018/063850 on Dec. 4, 2018, now Pat. No. 12,128,394.

(60) Provisional application No. 62/594,085, filed on Dec. 4, 2017.

(51) Int. Cl.
| | |
|---|---|
| *B01J 41/09* | (2017.01) |
| *B01J 41/05* | (2017.01) |
| *B01J 41/07* | (2017.01) |
| *B01J 41/10* | (2006.01) |
| *B01J 47/016* | (2017.01) |
| *B01J 49/07* | (2017.01) |
| *B01J 49/57* | (2017.01) |
| *C02F 1/42* | (2023.01) |
| *C02F 101/34* | (2006.01) |
| *C02F 101/36* | (2006.01) |

(52) U.S. Cl.
CPC ............... *B01J 41/09* (2017.01); *B01J 41/05* (2017.01); *B01J 41/07* (2017.01); *B01J 41/10* (2013.01); *B01J 47/016* (2017.01); *B01J 49/07* (2017.01); *B01J 49/57* (2017.01); *C02F 1/42* (2013.01); *C02F 2001/422* (2013.01); *C02F 2101/34* (2013.01); *C02F 2101/36* (2013.01)

(58) Field of Classification Search
None
See application file for complete search history.

(56) References Cited

U.S. PATENT DOCUMENTS

| | | | | |
|---|---|---|---|---|
| 12,128,394 | B2 * | 10/2024 | Poler | C02F 1/288 |
| 2002/0169331 | A1 * | 11/2002 | Miura | C07C 45/81 |
| | | | | 552/1 |

(Continued)

*Primary Examiner* — John J Figueroa
(74) *Attorney, Agent, or Firm* — J. Clinton Wimbish; Maynard Nexsen PC

(57) ABSTRACT

In one aspect, separation media are described herein operable for removing one or more water contaminants, including NOM, fluorinated chemicals, and/or derivatives thereof. Briefly, a separation medium comprises a silica-containing granular support; and an oligomeric stationary phase forming a film on individual grains of the granular support. In some embodiments, the oligomeric stationary phase comprises oligomeric chains covalently bound to the individual grains.

19 Claims, 11 Drawing Sheets

(56) References Cited

U.S. PATENT DOCUMENTS

| | | | |
|---|---|---|---|
| 2006/0054542 A1* | 3/2006 | Okada | B01J 47/12 210/198.2 |
| 2008/0203029 A1* | 8/2008 | Deorkar | B01J 20/285 210/659 |
| 2010/0029914 A1* | 2/2010 | Komiya | C08F 8/34 521/149 |
| 2013/0040809 A1* | 2/2013 | Bergstrom | B01J 20/3242 502/400 |
| 2016/0153981 A1* | 6/2016 | Nishida | G01N 33/552 423/325 |
| 2016/0289146 A1* | 10/2016 | Laroche | B01J 20/3042 |
| 2017/0056854 A1* | 3/2017 | Gu | B01J 20/289 |
| 2019/0358621 A1* | 11/2019 | Pohl | B01J 20/3268 |

\* cited by examiner

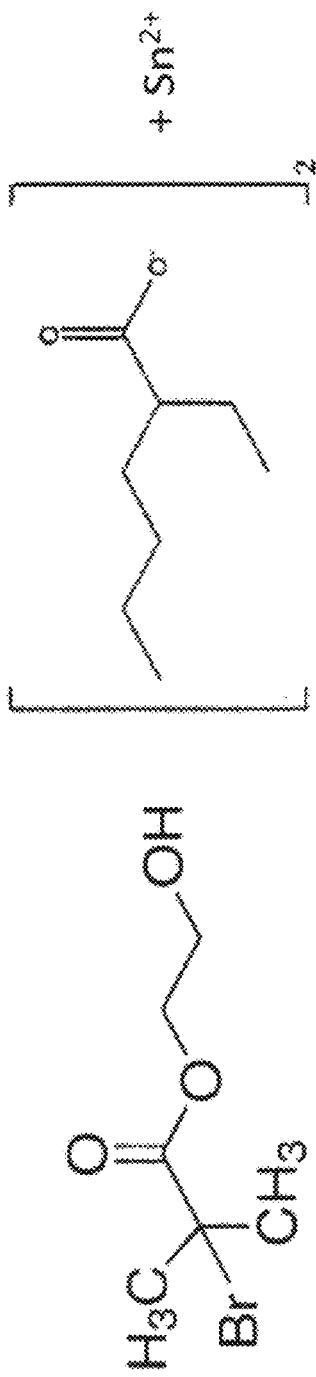
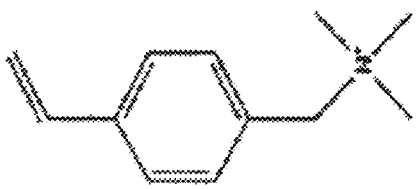
Initiator
FIG. 3A
Transition Metal Catalyst
FIG. 3B
Monomer
FIG. 3C

SEPARATION MEDIA, DEVICES AND APPLICATIONS THEREOF

RELATED APPLICATION DATA

The present application is a continuation application of U.S. patent application Ser. No. 16/768,344 filed May 29, 2020, which is a United States National Phase of PCT/US2018/063850, filed Dec. 4, 2018, which claims priority pursuant to 35 U.S.C. § 119(e) to U.S. Provisional Patent Application Ser. No. 62/594,085, filed on Dec. 4, 2017, which is incorporated herein by reference in its entirety.

FIELD

This application relates to materials, devices, and methods of removing contaminants from a liquid and, more particularly, to separation medium for water treatment, and related devices and methods making and using the same.

BACKGROUND

Natural organic matter (NOM) is comprised of decomposed plant and animal residues, and exists in all active water resources. When NOM levels are too high (e.g., due to the natural or the continued rise of anthropogenic causes), they must be reduced via water treatment methods. NOM compounds, namely humic and fulvic acids, are also sources of potential health hazards to humans and animals that will ingest treated water.

Modern water treatment methods utilize chlorine to destroy microbial pathogens. However, chlorine reacts with humic substances in NOM and forms disinfection byproducts (DBPs) that have deleterious human health risks. Moreover, the two most common regulatory problems stem from trihalomethanes (THMs) and haloacetic acids (HAAs), and subsequent interest has been placed on efficient removal of their precursors.

It is becoming increasingly difficult for water treatment facilities to mitigate the formation of DBPs at the limits set by the USEPA (i.e., 80 ppb for THM and 60 ppb for HAA). Prolonged exposure to DBPs can lead to kidney, liver, and central nervous system damage, as well as cancer. Better treatment technologies are needed to improve water quality and reduce the precursors which lead to the formation of carcinogenic DBPs in drinking water.

Removal of NOM is a primary concern for providing safer, cleaner water, and the extent of its removal depends on the efficiency of the treatment methods employed. Mismanagement of water treatment facilities and poor public policy, acutely punctuated by the events in Flint MI, exemplify a potential systemic risk to our society. Even with the practice of "enhanced coagulation" as prescribed by the USEPA, a source water with 2 mg/L of dissolved organic carbon (DOC) and a moderate alkalinity of 60-120 mg/L would only be required to remove 25% of the total organic carbon present in the water.

Many water treatment facilities rely solely on coagulation as the means of lowering levels of DOC; however, this is not an effective method of removing low molecular weight and hydrophilic varieties of NOM, as such smaller molecules are more readily removed via adsorption.

Some treatment facilities are looking into utilizing activated carbon to adsorb NOM, however; this method comes with a high operating cost. With increasing concentrations of NOM being observed in drinking water sources worldwide, there has been a significant increase in demand for more efficient removal.

Additionally, per- and polyfluoroalkyl substances (PFAS) are emerging contaminants present in many consumer goods. These fluorochemicals are of significant concern due to their potential health effects. Because of their high water solubility, they are ubiquitous in drinking water sources, including groundwater, which becomes the main source of exposure to humans. Efforts in sustainable manufacturing of chemical compounds require that compounds for release into the environment are degradable. PFAS are very stable and little is known about their biodegradability. Even less is known about their mineralization (complete biodegradation to $CO_2$, $F^-$, and water, etc).

Release of polyfluoroalkyl chemicals into the environment can result in the formation of perfluoroalkyl carboxylic (PFCAs) and sulfonic acids (PFSAs), such as perfluorooctanoic acid (PFOA) and perfluorooctane sulfonic acid (PFOS). These compounds are highly persistent and detected widely in the environment. It is unclear if these smaller moieties can be mineralized and, so far, a lack of mineralization data has been reported. Moreover, multiple studies on the degradation of various PFAS concluded that these compounds are stable in the environment.

Accordingly, a need exists for improved materials, devices, and methods of removing NOM, PFAS and other contaminants from liquids, such as water, and for providing safer drinking water having reduced levels of DBPs and PFAS.

SUMMARY

In one aspect, granular separation media are described herein. In some embodiments, a separation medium comprises a silica-containing granular support, and an oligomeric stationary phase coupled to individual grains of the granular support, the oligomeric stationary phase comprising oligomeric chains covalently bound to the individual grains. In some embodiments, for example, the oligomeric chains are covalently bound to silica moieties of the grains. Silica moieties forming covalent bonds with the oligomeric chains can be located at grains surfaces and/or throughout the bulk of individual grains.

In another aspect, a filtration bed comprises a plurality of silica-containing grains and an oligomeric stationary phase coupled individual silica-containing grains, the oligomeric stationary phase comprising oligomeric chains covalently bound to the individual grains. In some embodiments, the plurality of silica-containing grains having stationary phase coupled thereto form one or more layers of the filtration bed. The filtration bed, in some instances, is chemically regenerable for reuse.

In another aspect, a method of treating a water source comprises providing a water treatment device having a separation medium comprising a silica-containing granular support, and an oligomeric stationary phase coupled to individual grains of the granular support, the oligomeric stationary phase comprising oligomeric chains covalently bound to the individual grains. The separation medium is contact with the water source and one or more contaminant species are removed from the water source by the separation medium. In some embodiments, the method further comprises regenerating the separation medium by treatment with an acid, a base, or a salt solution. During regeneration of the separation medium, contaminants can in some cases be removed from the separation medium through displacement with the acid, the base, or the salt solution.

As described herein, oligomeric chains described herein are covalently bound to silica moieties of individual grains. Silica moieties covalently bonding with oligomeric chains can be located on particle surfaces as well as in the particle bulk. In some instances, the oligomeric chains are not cross-linked. A length of an oligomeric chain described herein can comprise 4 to 100 monomer units.

In some embodiments, oligomeric chains can include one or more cationic moieties for anion exchange. For example, in some cases the cationic moieties comprise quaternary ammonium groups. In other embodiments, oligomeric chains can include anionic moieties for cation exchange.

A silica-containing granular support described herein, in some embodiments, can comprise a sand, zeolite, a ceramic, a glass, or any combination thereof. Individual grains forming the silica-containing granular support can have an average size range of 5 microns to 5,000 microns. In some instances, individual grains comprise a plurality of pores.

In some embodiments, the oligomeric chains of the stationary phase can form a film on surfaces of the individual grains. A film can be conformal to surfaces of the individual grains in some embodiments. In embodiments where the silica-containing granular support is zeolite, the film can in some instances be conformal to both an exterior surface and interior surfaces. Additionally, when the silica-containing granular support is zeolite, the zeolite can comprise a plurality of pores, and each pore is substantially free of the oligomeric chains. In some embodiments, a film described herein can have a thickness of 1 nm to 100 nm. In some instances, a film described herein is a brush polymer.

In a further aspect, methods of regenerating particle filtration media are described herein. In some embodiments, a method of regenerating a particle filtration medium comprises providing a used particle filtration medium wherein cationic sites of the used filtration medium are occupied by non-solute particles removed from a suspension passed through the filtration medium. A brine treatment and/or base treatment is provided, and the used filtration medium is contacted with the brine treatment and/or base treatment to displace the non-solute particles from the cationic sites.

These and other embodiments are described in more detail in the detailed description which follows.

BRIEF DESCRIPTION OF THE DRAWINGS

FIGS. 3A-3C illustrate the chemical structure of an aqueous initiator, reducing agent, and monomer used to synthesize nanomaterials described herein.

DETAILED DESCRIPTION

Figure 1A:
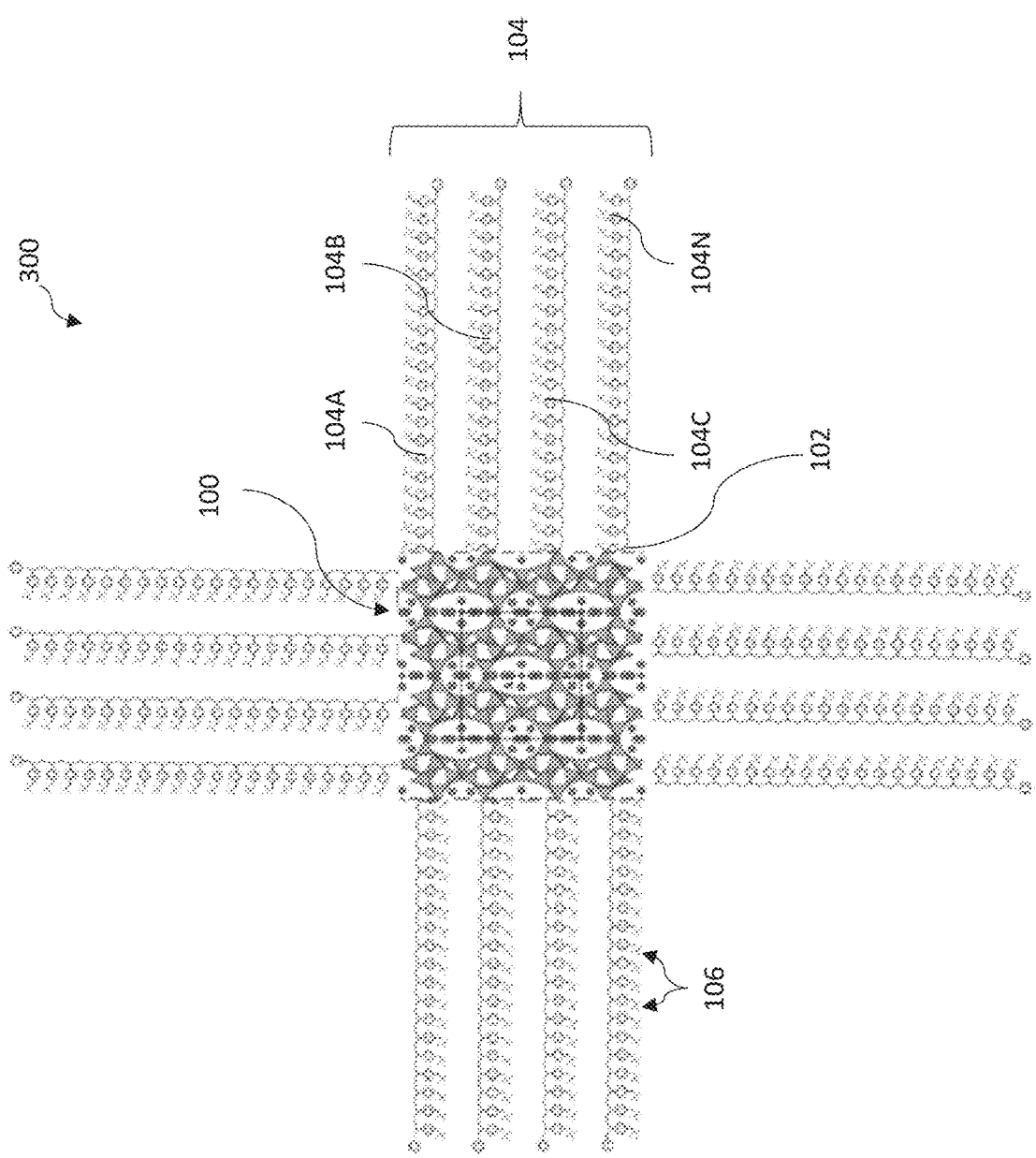
FIG. 1A is a schematic illustration of a silica-containing granular support functionalized with an oligomeric stationary phase.

Embodiments described herein can be understood more readily by reference to the following detailed description, examples, and figures (i.e., "FIGS."). Nanomaterials, granular supports, devices, and methods described herein, however, are not limited to the specific embodiments presented in the detailed description, examples, and figures. It should be recognized that these embodiments are merely illustrative of the principles of this disclosure. Numerous modifications and adaptations will be readily apparent to those of skill in the art without departing from the disclosed subject matter.

All ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

Further, all ranges disclosed herein are also to be considered to include the end points of the range, unless expressly stated otherwise. For example, a range of "between 5 and 10" or "5 to 10" or "5-10" should generally be considered to include the end points 5 and 10.

Additionally, in any disclosed embodiment, the terms "substantially," "approximately," and "about" may be substituted with "within [a percentage] of" what is specified, where the percentage includes 0.1, 1, 5, and 10 percent.

The terms "a" and "an" are defined as "one or more" unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a composition or other object that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

It is further understood that the feature or features of one embodiment may generally be applied to other embodiments, even though not specifically described or illustrated in such other embodiments, unless expressly prohibited by this disclosure or the nature of the relevant embodiments. Likewise, materials, devices, and methods described herein can include any combination of features and/or steps described herein not inconsistent with the objectives of this disclosure. Numerous modifications and/or adaptations of the materials, devices, and methods described herein will be readily apparent to those skilled in the art without departing from the subject matter described herein.

NOM is comprised of decomposed plant and animal residues, encompassing a variety of organic compounds, with a wide range of molecular weights. The majority of these compounds are weak electrolytes, lending themselves to ionic interactions with separation media. Unfortunately, anion exchange resins (AERs) are limited in their ability to remove positively charged or neutral NOM; conversely, styrenic polymer resins have demonstrated an increased ability to adsorb these types of NOM due to dispersive interactions with the styrene backbone. Commercially available ion exchange resins have been proven to be more effective than coagulation and activated carbon treatment methods. However, due to low specific surface area (SSA), accessible ion-exchange surface area is limited. While small molecules can effuse into the near-surface region of the material given sufficient time, high molecular weight NOM cannot. This slows the sorption kinetics and also lowers the overall capacity of the resin because these large molecules restrict transport of smaller molecules to the active adsorption sites. Moreover, intraparticle diffusion mechanisms further retard ion exchange equilibrium rates and separation efficiencies.

I. Separation Medium

A separation medium comprises a silica-containing granular support (referred to as "granular support"), and an oligomeric stationary phase coupled to individual grains of the granular support, the oligomeric stationary phase comprising oligomeric chains covalently bound to the individual grains. In some embodiments, for example, the oligomeric chains are covalently bound to silica moieties of the grains. Silica moieties forming covalent bonds with the oligomeric chains can be located at grain surfaces and/or throughout the bulk of individual grains.

Turning now to specific components, the separation medium comprises a silica-containing granular support formed of individual grains or particles. Any type of silica-containing granular support not inconsistent with the objectives of this disclosure can be used. Grains of the support can be inorganic or organic, so long as the support comprises silica. In some embodiments, granular supports include, but are not limited to, sand, zeolite, ceramic, glass, or any combination thereof. Any type of sand, ceramic, or glass comprising silica can be used. Zeolite includes microporous or mesoporous materials commercially available in a variety of natural and synthetic forms. Any of these natural and synthetic forms of zeolite can be used herein as a silica-containing granular support. The sand can be any sand not inconsistent with the objectives of this disclosure, such as any silica-containing sand or activated glass. The ceramic can be any ceramic not inconsistent with the objectives of this disclosure, such as positively charged ceramics known in the art.

Individual grains of the support can have any dimensions not inconsistent with the objectives of this disclosure. In some embodiments, individual grains of the granular support can have an average size of 1 micron to 5,000 microns (μm) prior to functionalization with the oligomeric stationary phase. In some instances, individual grains can have an average diameter of 50 μm to 5,000 μm or 100 μm to 4,000 μm. The granular support, in some embodiments, may have a single grain size distribution, bimodal grain size distribution or multi-modal grain size distribution. Grain size distributions can be selected according to a variety of considerations including, but not limited, desired surface areas, tortuosity factors and/or flow rates of filtration beds and/or membranes employing the oligomeric-functionalized grains.

In some embodiments, the granular support is formed of the same type of material, such as zeolite, sand, ceramics, glass, and the like. In other embodiments, individual grains of the granular support have differing structural identity and/or shapes. Individual structural identity, for example, can vary according to position in the support, such as different average grain diameters being positioned at different locations within the support. Structural identity of the individual grains can be selected according to several considerations including, but not limited to, interaction of the individual grains with the oligomeric stationary phase, packing characteristics of the individual grains and/or mechanical properties imparted by the individual grains.

Individual grains of the granular support can have any shape not inconsistent with the objectives of this disclosure. For example, in some embodiments the individual grains can have an irregular shape, or a regular shape, such as spherical, triangular, cylindrical, cubical, rectangular, hexagonal, or any combinations thereof.

Moreover, in some embodiments, different combinations of granular support can be used. For example, a zeolite could be used in combination in some instances with a sand or ceramic.

The separation medium also comprises an oligomeric stationary phase. In some embodiments, oligomeric chains of the stationary phase are covalently bonded to the individual grains of the granular support. In some embodiments, the covalently bonded oligomeric chains form a stationary phase film or brushes the individual grains. The oligomeric chains, in some embodiments, are covalently bonded to silica moieties of individual grains. Silica moieties covalently bonding with oligomeric chain can be located on exterior and/or interior surfaces of individual grains. In some embodiments, silica moieties covalently bound to oligomeric chains are located throughout bulk regions of the individual grains. For example, silica moieties in the bulk of zeolite grains can covalently bond with oligomeric chains. In some embodiments, oligomeric chains of the stationary phase are not found within pores of zeolite grains while exhibiting covalent binding in the bulk.

Moreover, the oligomeric chains can include one or more cationic moieties for anion exchange. The cationic moieties can have compositional identity to provide a strong anion exchange medium or weak anion exchange medium. Cationic moieties, for example, can comprise quaternary ammonium groups. Alternatively, the oligomeric chains can comprise one or more anionic moieties for cation exchange. Anionic moieties can have compositional identity to provide strong cation exchange medium or weak cation exchange medium. In some embodiments, for example, anionic moieties include sulfonic acid groups, carboxylic acid groups and corresponding salts and/or derivatives thereof. In further embodiments, oligomeric chains can be neutral, wherein charged moieties are absent on the oligomeric chains.

Figure 1B:
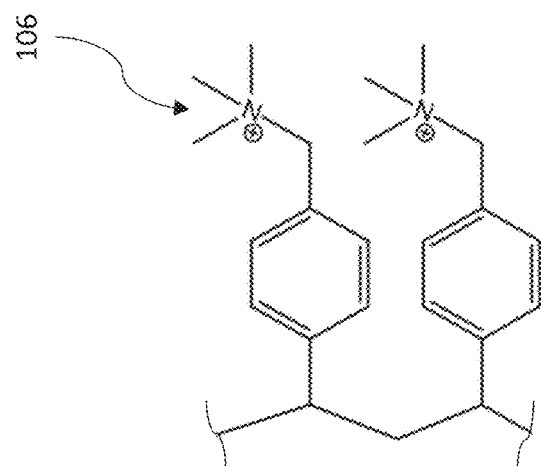
FIG. 1B is an illustration of the chemical constituents forming an oligomeric chain.
Figure 6A:
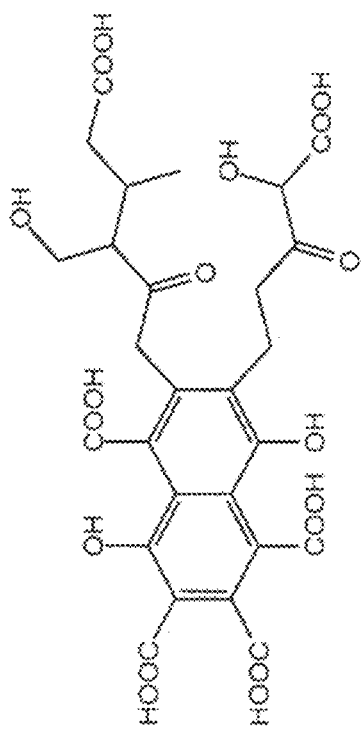
FIGS. 6A and 6B illustrate the chemical structure of exemplary NOM adsorbents.
Figure 6B:
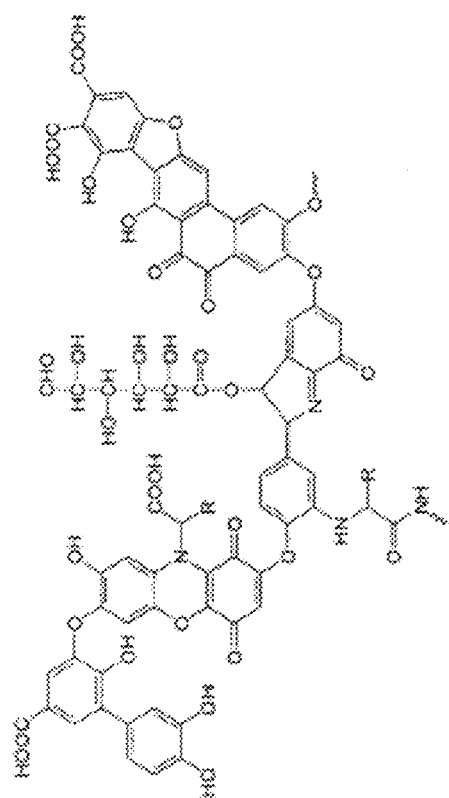

The oligomeric stationary phase, in some embodiments, is not cross-linked. Oligomeric chains can be independent of one another and do not share any cross-linking bonds. FIG. 1 illustrates an individual grain covalently functionalized with oligomeric chains comprising quaternary ammonium cationic moieties for anion exchange according to one embodiment. As illustrated in FIG. 1A, a stationary phase film 104 is formed by the individual oligomeric chains 104A, 104B, 104C, to 104N (i.e., where "N" is a whole number integer >3) covalently bonded to an exterior surface 102 of the individual zeolite grain 100. The individual oligomeric chains each comprise quaternary cationic moieties 106 for anion exchange, such as anionic exchange with NOM, PFAS, fluorinated compounds and/or metal species in a liquid or water source (also referred to as "target species" or "adsorbents"), including the humic acid NOM species illustrated in FIGS. 6A and 6B. An exemplary quaternary cationic moiety comprising an ammonium moiety 106 is shown in FIG. 1B.

Figure 2:
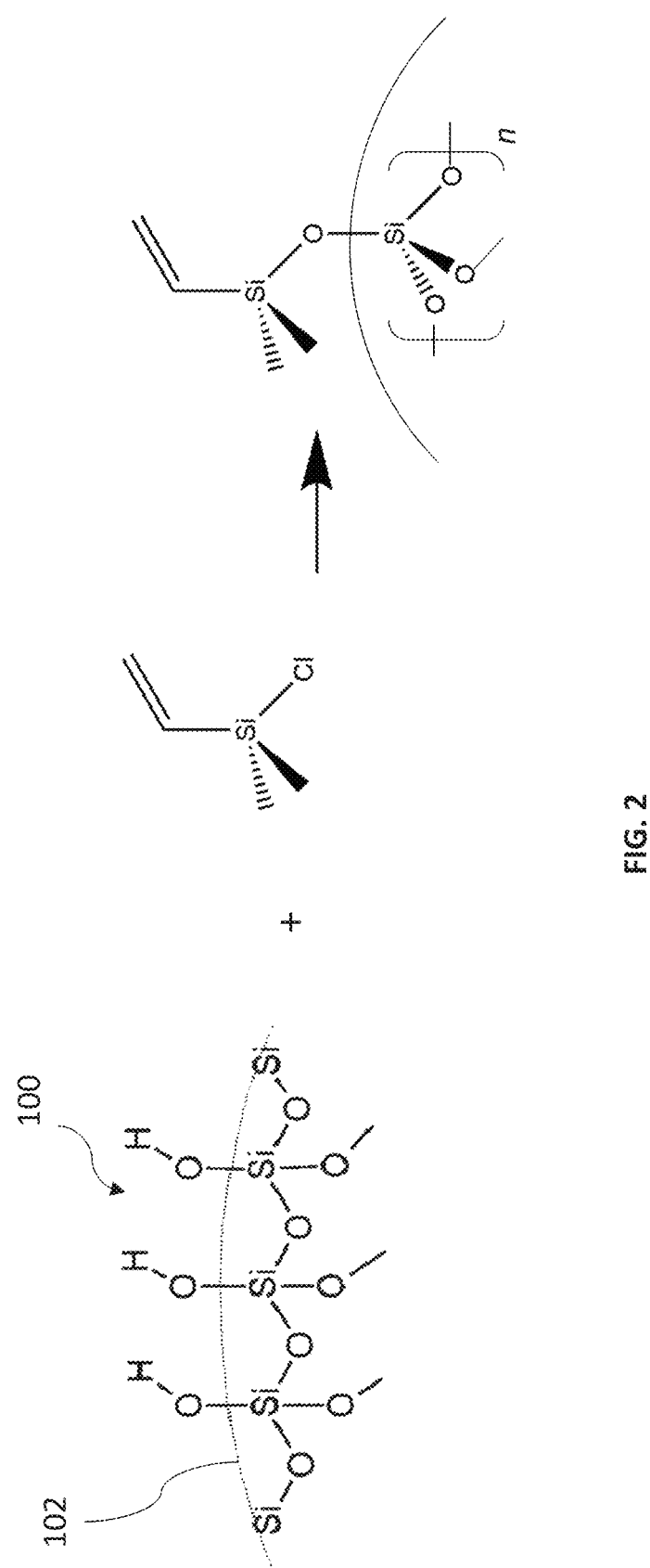
FIG. 2 illustrates the chemical functionalization of silica groups on the surface of a silica-containing granular support.

As described further herein, individual grains of FIG. 1A can be covalently functionalized in a manner shown in FIG. 2. In FIG. 2, an exterior surface 102 of an individual grain 100 comprises a plurality of silica-based functional groups, such as the silicates shown. Notably, while FIG. 2 shows exterior surface silicates, this description equally applies to silica-based functional groups located on an interior surface of the individual grains, as previously described herein. As specifically shown in FIG. 2, in some embodiments the silica-based functional groups can be functionalized with a vinylic moiety by reacting, in this instance, with chloro (dimethyl)vinylsilane. The vinyl silane can then be further functionalized, such as in an aqueous environment, with an initiator, transition metal catalyst, and a vinyl-benzyl trimethyl ammonium chloride (vbTMAC) monomer shown in FIGS. 3A to 3C, respectively, to produce oligo(vbTMAC), as described in more detail below in Example 2 and FIG. 13. The initiator and transition metal catalyst are merely exemplary embodiments, but the invention is not limited solely to these examples. Instead, any initiator or transition metal catalyst not inconsistent with the objectives of this disclosure can be used, such as a copper catalyst illustrated in FIG. 13. Example 2 discussed hereinbelow provides further detail regarding formation of aN oligomeric stationary phase on individual grains of a granular support.

Figure 4:
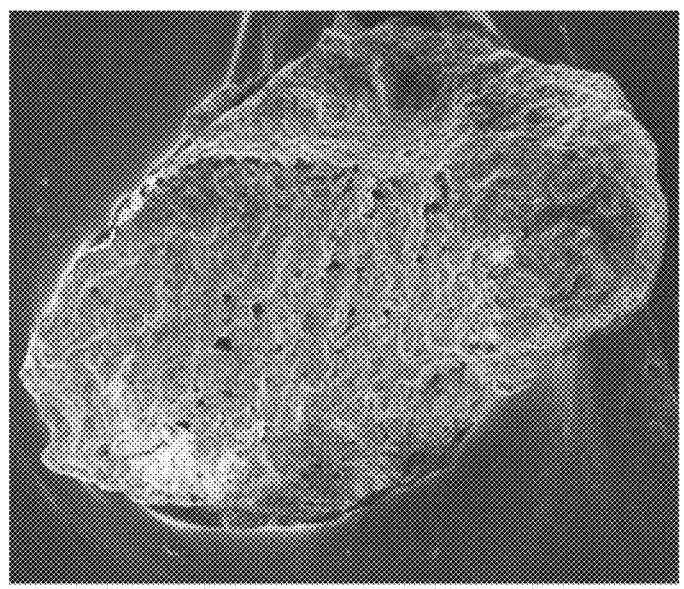
FIG. 4 is a scanning electron microscopy (SEM) image of a functionalized zeolite grain.
Figure 5:
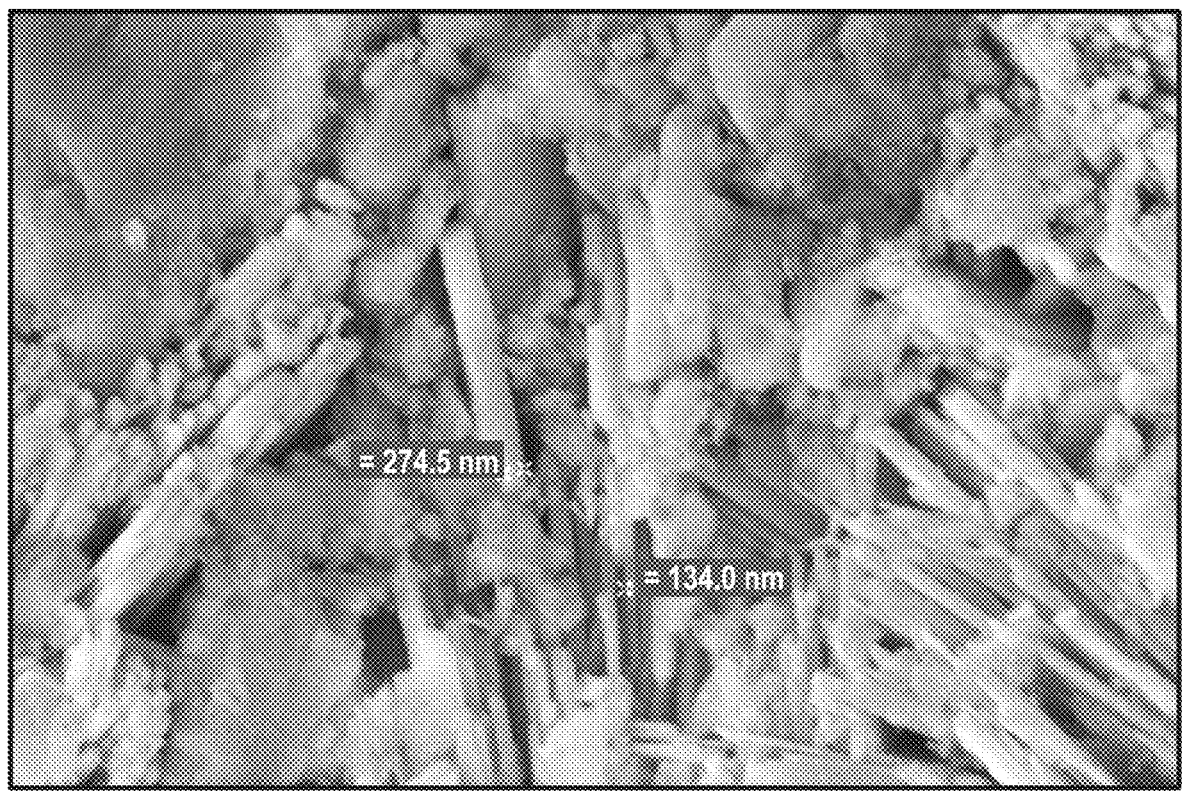
FIG. 5 is an SEM image of a surface of the functionalized zeolite grain of FIG. 4.

FIG. 4 is a scanning electron micrograph of a zeolite grain surface-functionalized with oligo(vb-TMAC) according to one embodiment. FIG. 5 shows a higher magnification image of the bulk of the functionalized zeolite grain of FIG. 4. As shown in FIG. 5, oligomeric chains covalently functionalize bulk surfaces throughout the zeolite grain, thereby providing significant enhancements to surface area available for capture of fluid contaminants.

I. Filtration Bed

In another aspect, a filtration bed comprises a plurality of silica-containing grains and an oligomeric stationary phase coupled individual silica-containing grains, the oligomeric stationary phase comprising oligomeric chains covalently bound to the individual grains. In some embodiments, the plurality of silica-containing grains having stationary phase coupled thereto form one or more layers of the filtration bed. The filtration bed, in some instances, is chemically regenerable for reuse. The silica-containing grains, oligomeric stationary phase, and oligomeric chains can be any of the respective grains, phases, and oligomeric chains described in Section I.

Figure 7:
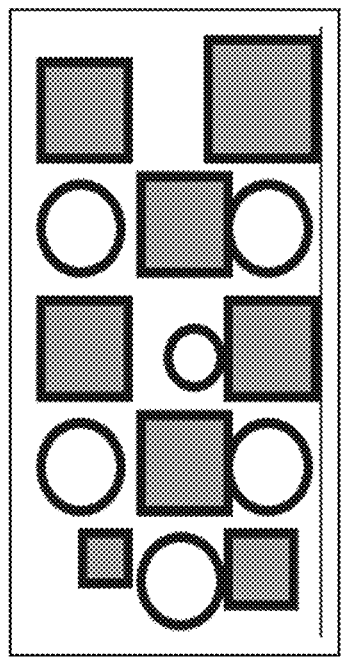
FIG. 7 schematically illustrates a filtration bed comprising separation media described herein.

In some embodiments, the plurality of silica-containing grains form a packed filtration bed. The packed filtration bed can comprise grains having similar compositions and shapes, or in other instances, can comprise grains having different compositions and/or shapes. For example, as shown in FIG. 7, grains of different types (shown as squares and circles) and different sizes can be combined to form a filtration bed. By altering the composition and/or shapes of the grains being used, liquid flow rates, filtration efficiency, and workable lifetime of the filtration bed can be tailored for specific applications.

III. Water Treatment Devices

In another aspect, a method of treating a water source comprises providing a water treatment device having a separation medium comprising a silica-containing granular support, and an oligomeric stationary phase coupled to individual grains of the granular support, the oligomeric stationary phase comprising oligomeric chains covalently bound to the individual grains. The separation medium is contact with the water source and one or more contaminant species are removed from the water source by the separation medium. In some embodiments, the method further comprises regenerating the separation medium by treatment with an acid, a base, or a salt solution. During regeneration of the separation medium, contaminants can in some cases be removed from the separation medium through displacement with the acid, the base, or the salt solution. The silica-containing grains, oligomeric stationary phase, and oligomeric chains can be any of the respective grains, phases, and oligomeric chains described in Section I. Moreover, the separation medium can have an architecture described in Section II.

Figure 8A:
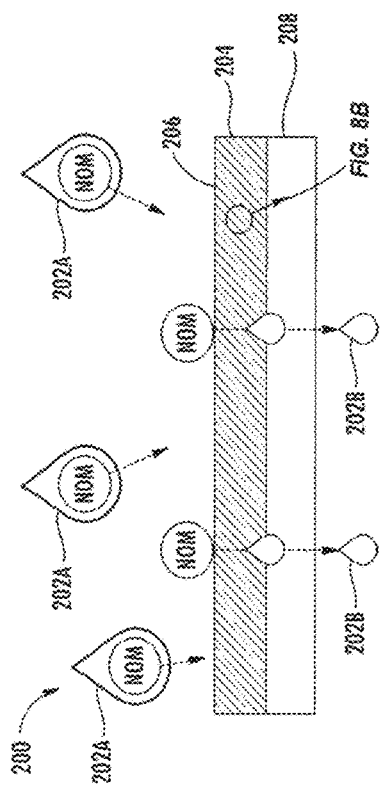
FIGS. 8A and 8B schematically illustrate devices comprising separation media described herein.
Figure 8B:
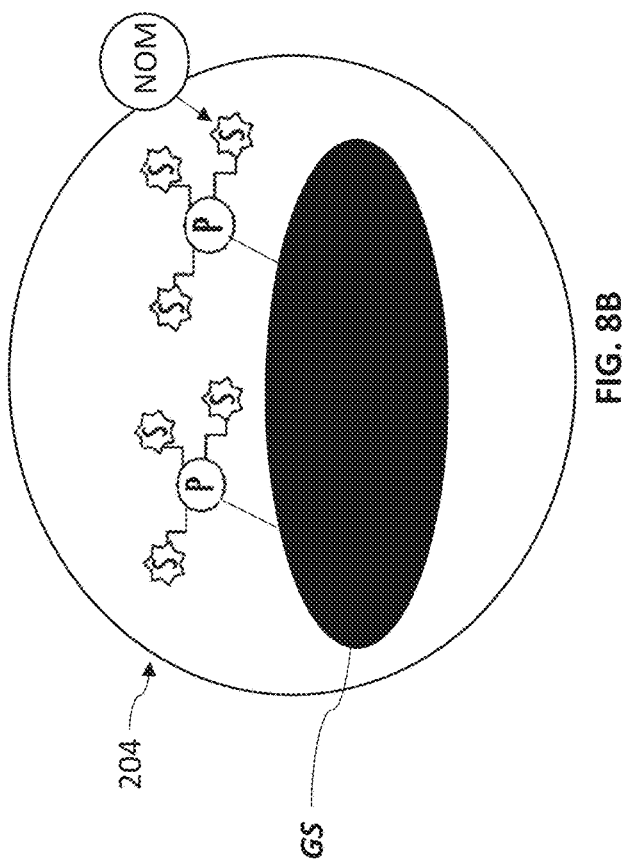

FIGS. 8A-8B schematically illustrate a water treatment device generally designated 200 according to some embodiments described herein. Referring to FIG. 8A, the device 200 is configured to remove contaminant species, including NOM, PFAS, fluorinated compounds and/or halogenated compounds from a volume of water via adsorption. For example, as contaminated water 202A contacts device 200, NOM adsorbs to one or more surfaces of the device so that clean, treated water 202B can then pass across and/or through the device.

Figure 10:
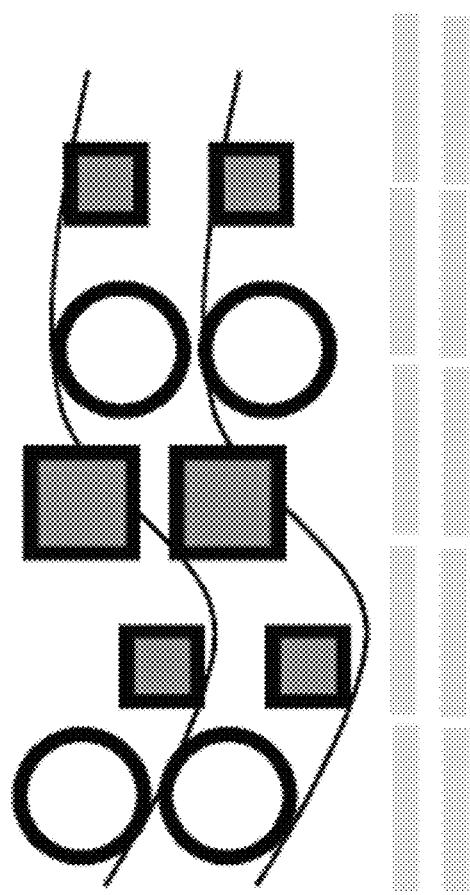
FIG. 10 is a schematic of a membrane filter comprising functionalized grains described herein.

In some embodiments, the device 200 comprises a permeable or semipermeable device for filtering, cleaning, purifying, and/or otherwise treating contaminated water 202A. Device 200 includes multiple layer of separation media 204, 208. The separation media 204, 208 can be a separation medium described in Section I or II. The separation media 204, 208 can be packed beds of functionalized grains described herein. In some embodiments, only one layer of the separation media 204, 208 is a filtration bed as described in Section II. The remaining layer may have different construction and/or chemistry, permitting the device 200 to address multiple fluid contaminants. Separation medium 204 comprises a contact surface 206 configured to adsorb NOM. PFAS, fluorinated compounds and/or halogenated compounds and other contaminant species thereto via ion-exchange. In other embodiments, the device 200 may be a membrane filter. FIG. 10 further illustrates a membrane filter construction comprising functionalized grains of various size. The grains can be linked or unlinked.

FIG. 8B is a schematic, zoomed-in view of separation medium 204 according to some embodiments. As FIG. 8B illustrates, separation medium 204 includes a plurality of granular support structures GS and an oligomeric stationary phase P forming a film or brushes on or over individual grains of the granular support structures GS. Oligomeric stationary phase P can be covalently bonded to granular support structures GS, and comprise one or more moieties for facilitating anion exchange or cation exchange with NOM particles, PFAS, fluorinated compounds and/or halogenated compounds at exchange sites S. Notably, after one or more uses of device 200 to treat water, NOM can be desorbed from separation medium 204 such that the separation medium can be regenerated and reused multiple times.

In some embodiments, device 200 is configured such that more than about 80 percent (%) of contaminant is removed from a volume of liquid, more than about 90% of contaminant is removed from a volume of liquid, more than about 95% of contaminant is removed from a volume of liquid, or up to about 100% of contaminant is removed from a volume of liquid. Device 200 can remove organic NOM, inorganic NOM, transition metal contaminants, and/or contaminants containing humic acid, fulvic acid, trihalomethane, haloacetic acid, a carboxylate group, or a phenolate group. Device 200 may also remove PFAS, fluorinated compounds, and/or halogenated compounds. In some embodiments, fluorinated compounds include those listed in the following table.

|  |
| --- |
| Heptafluorobutyric acid (HFBA) |
| Perfluorooctanoic acid (PFOA) |
| 2,2,2-Trifluoroethyl |
| Nonafluorobutanesulfonate (PFBS) |
| 6:2 Fluorotelomer sulfonate (6:2 FTS) |
| 8:2 Fluorotelomer Alcohol (8:2 FTOH) |

IV. Method of Treating Water

Figure 9:
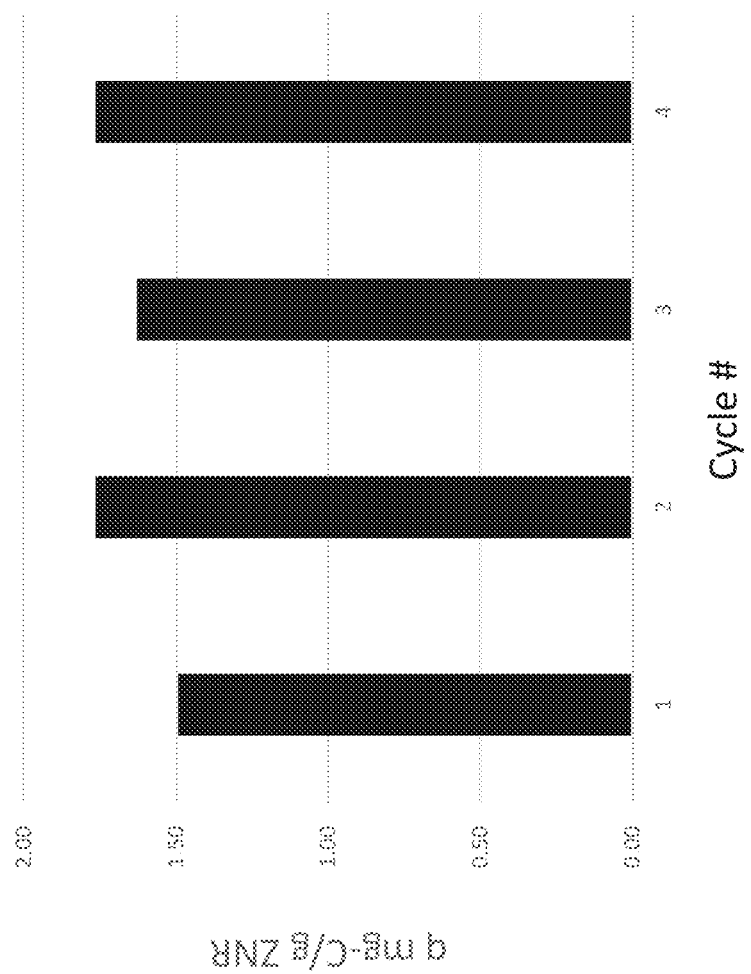
FIG. 9 graphically illustrates adsorbent data obtained via regenerating and reusing separation media described herein.

In a further aspect, methods of treating water are also described herein. A method of treating water comprises providing a water treatment device having a separation medium comprising a silica-containing granular support, and an oligomeric stationary phase coupled to individual grains of the granular support, the oligomeric stationary phase comprising oligomeric chains covalently bound to the individual grains. The separation medium is contacted with the water source, and one or more contaminant species are removed from the water source by the separation medium. In some embodiments, the method further comprises regenerating the separation medium by treatment with an acid, a base, or a salt solution. During regeneration of the separation medium, contaminants can be removed from the separation medium through displacement with the acid, the base, or the salt solution. The separation medium can have any structure and properties described in Sections I-III hereinabove. In some embodiments, contaminant removal efficiency is not compromised or degraded by the regeneration process. For example, as illustrated in FIG. 9, contaminant removal efficiency of the separation medium does not deviate more than 5 percent between regeneration cycles. In some embodiments, the separation medium does not deviate more than 2 percent or 1 percent between regeneration cycles.

Accordingly, a method described herein can further comprise the step of regenerating the separation medium by treatment with an acid, a base, or a salt solution. The treatment contaminants are removed from the separation medium through displacement with the acid, the base, or the salt solution. Strong acid cation exchange resin can be regenerated using any acid not inconsistent with the objectives of this disclosure. In some embodiments, strong acid cation exchange resins can be regenerated using a strong acid, such as sulphuric or hydrochloric acid. In practice, these strong acids effectively strip off calcium, magnesium and sodium bound to the resin, and substitute hydrogen in their place, effectively regenerating the resin. In some instances, the strong acid applied to the strong acid cation exchange resin has a concentration of 1% to 10%, 2% to 10%, 3% to 10%, 4% to 10%, 5% to 10%, 6% to 10%, 7% to 10%, 8% to 10%, 1% to 9%, 1% to 8%, 1% to 7%, 1% to 6%, 1% to 5%, 1% to 4%, 1% to 3%, 2% to 8%, 4% and 6%, 1%, 2%, 3%, 4%, 5%, 6%, 7%, 8%, 9%, or 10%.

Strong base anion resins can be regenerated using any base not inconsistent with the objectives of this disclosure. In some embodiments, strong base anion resins can be regenerated using a strong base, such as caustic soda or sodium hydroxide (NaOH). In some instances, a solution of strong base can have a concentration of 1%, 2%, 3%, 4%, 5%, 6%, 7%, 8%, 9%, or 10%. The strong base solution can remove anions bound to the resin and substitute —OH in their place, effectively regenerating the resin. In some embodiments, the strong base solution is applied to the resin at a flow rate of 0.1 to 1 gpm, 0.2 to 1 gpm, 0.3 to 1 gpm, 0.4 to 1 gpm, 0.5 to 1 gpm, 0.6 to 1 gpm, 0.7 to 1 gpm, 0.8 to 1 gpm, 0.1 to 0.9 gpm, 0.1 to 0.8 gpm, 0.1 to 0.7 gpm, 0.1 to 0.6 gpm, 0.1 to 0.5 gpm, 0.1 to 0.4 gpm, 0.1 to 0.3 gpm, 0.2 and 0.5 gpm, or 0.4 to 0.8 gpm per cubic foot. A contact time of the strong base solution can be 30 to 80 min, 40 to 80 min, 50 to 80 min, 60 to 80 min, 30 to 70 min, 30 to 60 min, 30 to 50 min, 30 to 40 min, or 45 to 60 min.

Weak ion exchange resins can be regenerated using any salt not inconsistent with the objectives of this disclosure. In some embodiments, a weak ion exchange resin can be regenerated using a NaCl salt in a brine solution. The salt can be applied in a concentration of 1%, 2%, 3%, 4%, 5%, 6%, 7%, 8%, 9%, 10%, 11%, 12%, 13%, 14%, 15%, 1% to 15%, 2% to 15%, 3% to 15%, 4% to 15%, 5% to 15%, 6% to 15%, 7% to 15%, 8% to 15%, 9% to 15%, 10% to 15%, 11% to 15%, 12% to 15% 13% to 15%, 1% to 15%, 1% to 14%, 1% to 13%, 1% to 12%, 1% to 11%, 1% to 10%, 1% to 9%, 1% to 8%, 1% to 7%, 1% to 6%, 1% to 5%, 1% to 4%, 1% to 3%, 2% to 10%, 2% to 8%, or 4% and 6%. The salt can have a contact time with the resin of 10 min, 20 min, 30 min, 40 min, or 50 min. The total contact time is calculated from the time the salt (in the form of a brine) is introduced to the bed until the salt is displaced from the bed during the slow rinse.

In a further aspect, methods of regenerating particle filtration media are described herein. Particle filtration media are used to remove non-solute particles or suspended particles from a fluid stream. In some embodiments, a method of regenerating a particle filtration medium comprises providing a used particle filtration medium wherein cationic sites of the used filtration medium are occupied by non-solute particles removed from a fluid stream passed through the filtration medium. A brine treatment and/or base treatment is provided, and the used filtration medium is contacted with the brine treatment and/or base treatment to displace the non-solute particles from the cationic sites. In some embodiments, particles displaced from the cationic sites have size greater than about 1 μm or greater than about 10 μm. In other embodiments, particles displaced from cationic sites can have a size of 0.02 μm to 1 μm. Cationic sites can comprise any cationic moieties consistent with the objectives of non-solute particle removal from a fluid stream, such as water or air. In some embodiments, cationic sites comprise quaternary ammonium groups or other amino groups including primary, secondary and/or tertiary amine groups.

Any brine and/or base treatment operable to displace non-solute particles from the cationic sites can be employed. In some embodiments, brine and/or base regenerating treatments described hereinabove can be used. For example, alkali metal salts, alkaline earth metal salts, or mixtures thereof can be used in the brine treatment. Anions of the salts can be monovalent or polyvalent including, but not limited to, halides, carbonates, phosphates and/or sulfates. Brine or base treatment alone can be employed in the regeneration process. Alternatively, brine in combination with base can be administered in the regeneration process. In some embodiments, the used particle filtration medium is contacted with the brine treatment followed by contact with the base treatment.

Particle filtration media regenerated according to methods described herein can exhibit various chemical structures. In some embodiments, the cationic sites are part of a chemical structure covalently bound to a support of the particle filtration medium. The cationic sites, for example, can be part of an oligomer, polymer or other molecular structure covalently bound to a support of the filtration medium. In other embodiments, the cationic sites are part of a chemical structure non-covalently bound to the particle filtration medium. The cationic sites can be part of a coating, such as a polymeric coating or surfactant coating, non-covalently attached to a support of the filtration medium. The filtration medium support can comprise particles, fibers, membranes or combinations thereof. In some embodiments, the filtration medium can be a packed bed, woven membrane, non-woven membrane or combinations thereof. The filtration medium, in some embodiments, can comprise positively charged ceramic, polymer-coated sand, surfactant coated zeolite, or mixtures thereof.

In some embodiments, regeneration of the used particle filtration medium does not damage or alter the filtration medium in any significant manner. For example, the particle filtration medium subsequent to regeneration can exhibit particle removal efficiency of at least 90 percent or at least 95 percent. Moreover, the used particle filtration medium can be regenerated numerous times including 5 or more times or 10 or more times before discardment.

Some embodiments described herein are further illustrated in the following non-limiting examples.

Example 1

Atom Transfer Radical Polymerization (ATRP) Reaction Conditions

FIG. 1A schematically illustrates a separation medium 300 comprising oligomeric chains 104A-104N covalently bonded to a zeolite grain or particle 100. The oligomeric chains may include ion-exchange moieties to provide an Anion Exchange Resin (AER). Atom Transfer Radical Polymerization (ATRP) was used to synthesize the AERs described herein.

AERs, namely, Strong Base Anion (SBA) exchange resins, are basic enough to remove both strong and weak acids from a liquid, such as water. That is, SBA resins can remove all anionic contaminants present in a given volume of liquid, not just weakly ionized NOM.

Type I SBA exchange resins, with a chloride counterion, were synthesized and covalently bonded to silica present on the surface of the zeolite grain 100 to exploit the very large specific surface area (SSA) intrinsic to zeolite. The zeolite act as scaffolding to support the resin (i.e. a "granular support"), and without the zeolite support, the polymer strands would simply form a resin bead with a much smaller SSA. The zeolite support is advantageous, as adsorbed material can be rinsed off and the separation medium can be reused.

As FIG. 1A illustrates, the oligomer chains forming the AER provide a conformal coating or brushes for zeolite surfaces. The ion-exchange oligomer includes a plurality of active ion exchange sites that adsorb contaminants described herein, and no crosslinking between adjacent polymer chains attached to the zeolite was observed.

Figure 11:
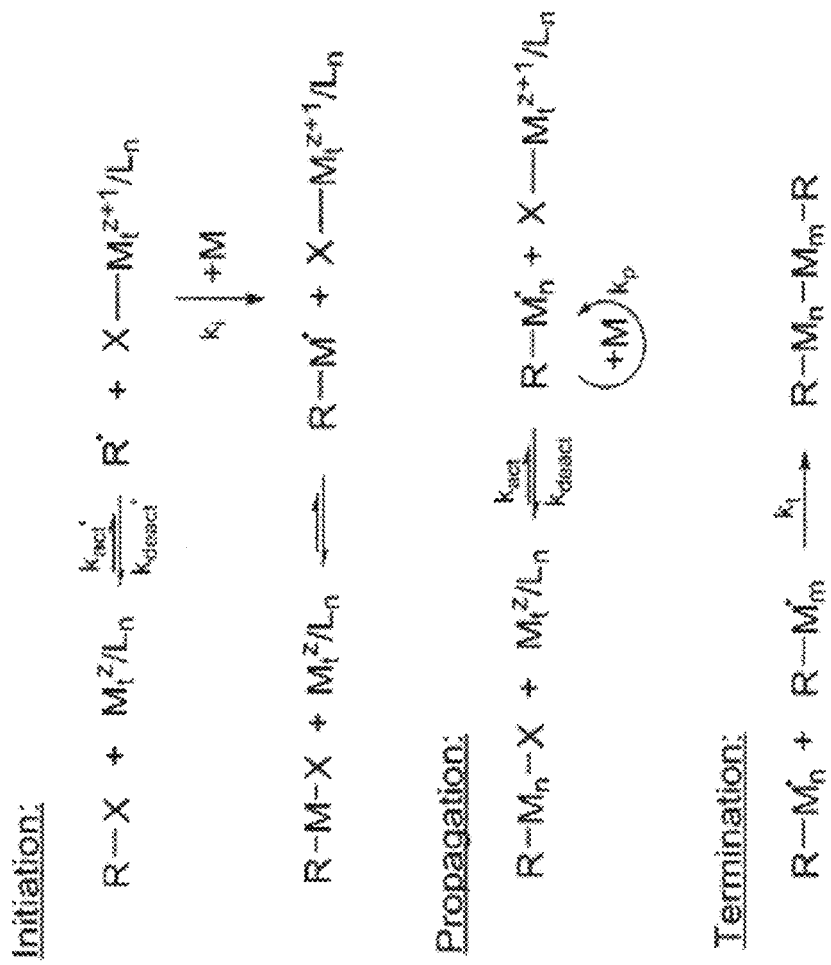
FIG. 11 illustrates a stepwise reaction mechanism of Atom Transfer Radical Polymerization (ATRP) that forms separation media described herein.

FIG. 11 illustrates the basic stepwise reaction mechanism of ATRP used to synthesize the oligomer chains covalently bonded to granular support for forming the separation medium and devices incorporating the separation medium according to embodiments described herein. ATRP was the chosen method for synthesis of the resin due to the versatility and adaptability of the method.

In FIG. 11, ATRP initiation occurs when the catalyst complex, consisting of a transition metal complexed with a ligand, $M_t^Z/L_n$, abstracts a halogen atom from the alkyl halide initiator, R—X, creating an active radical species, R•, and an oxidized catalyst complex, $X—M_t^{Z+1}/L_n$. This is a reversible step with a forward rate constant of $k'_{act}$, and a reverse rate constant of $k'_{deact}$. The radical special then reacts with the double bond of the vinyl monomer, M, to irreversibly form the first active polymer adduct, R—M•, with a rate constant of $k_i$. The chain is then reversibly deactivated through the back-transfer of the halogen atom from the catalyst complex; leaving a dormant chain, R—M—X, and the reduced catalyst, $M_t^Z/L_n$. This back transfer completes the redox cycle of the catalyst complex, allowing it to complete the process again.

After initiation, propagation proceeds for growing the ionic oligomeric chains to a desired length. In some embodiments, the oligomeric chains comprise 4-100 monomer units. According to FIG. 11 and during propagation, the catalyst species begins in the lower oxidation state, $M_t^Z/L_n$, where it can re-abstract and activate the polymer chain, with a rate constant of $k_{act}$. This leaves the catalyst complex in a higher oxidation state, $X—M_t^{Z+1}/L_n$, and an active radical chain, R—M•. The active chain can then propagate via the addition of a subsequent unsaturated monomer unit, with rate constant of $k_p$. Deactivation follows once again by back-transfer of the halogen atom from the catalyst to the active chain, with a rate constant of $k_p$, leaving the catalyst in the deactivated state, $M_t^Z/L_n$, and a dormant oligomer chain, R—$M_n$—X.

Throughout the propagation process, termination reactions ($k_t$) will inevitably occur, but in a well-controlled ATRP reaction, only a small percentage of the ionic oligomer chains will terminate. These reactions are primarily the result of bimolecular termination or catalyst disproportionation. Bimolecular termination occurs when two active chains combine (ex: R—$M_n$• and R—$M_m$•) to give an irreversibly dormant chain, R—$M_n$—$M_m$—R. This termination results in a buildup of the oxidized catalyst species, $X—M_t^{Z+1}/L_n$, which slows the overall rate of the reaction. Disproportionation of the catalyst complex can also result in an increase in $k_t$. This happens when the transition metal catalyst complex is in its lower/activating oxidation state is simultaneously oxidized and reduced, instead of activating the alkyl halide. For example, using a copper catalyst, $Cu^I$ should activate, but when undergoing disproportionation, $Cu^0$ and $Cu^{II}$ are formed. Since copper catalysts are most commonly used for ATRP, all further examples and figures will be based on a copper catalyst.

If initiation is fast and termination is negligible, in the absence of $O_2$, then well-defined oligomers with narrow molecular weight ranges will formed. Equilibrium exists between active (radical) chains and dormant (halide-capped) chains, as:

$$K_{ATRP} = \frac{k_{act}}{k_{deact}} \qquad \text{Eq. 1}$$

To limit bimolecular termination, the concentration of active radicals is kept low, therefore the majority of the chains are dormant at any given time, and the equilibrium is shifted to the left ($k_{deact} \gg k_{act}$). This means that a low concentration of radicals is required to propagate a large number of oligomer chains. To ensure that all oligomer chains have the same probability of adding a monomer unit, $k_{deact}$ must be significantly higher than the rate constant for propagation; if this is true, greater control and a much more narrow range of molecular weights can be achieved. The rate law of ATRP, $R_p$, relates directly to the equilibrium constant and is defined as:

$$R_p k_p [M][R-X] \frac{k_{act}[Cu^I X/L]}{k_{deact}[Cu^{II} X_2/L]}, \qquad \text{Eq. 2}$$

where [M] is the monomer concentration, [R—X] is the concentration of dormant chains (X is the initiator halide), [$Cu^I X/L$] is the concentration of the activating catalyst species (L is the catalyst ligand), and [$Cu^{II} X_2/L$] is the concentration of the deactivating catalyst species in the system. Since the majority of chains in a well-controlled ATRP system are dormant, [R—X] can be approximated based on the initiator concentration. The rate of polymerization will slow as monomer concentration decreases and is converted into oligomer. ATRP is a first-order kinetic process with respect to monomer concentration, as long as termination is minimal, and a constant concentration of the active catalyst species is maintained. The most controllable aspect of the rate of polymerization is via $K_{ATRP}$ ($k_{act}/k_{deact}$). Aside from the ratio of active to dormant chains, equilibrium is controlled by five parameters: initiator structure/leaving atom, catalyst (transition metal and ligand), solvent, temperature, and pressure.

All ATRP monomers have an accessible, terminal, (vinyl) double bond. Types of vinylic monomers used in ATRP synthesis include, acrylamides, acrylates, acrylonitrile, dienes, methacrylamides, methacrylates, styrenes, and derivatives thereof. Each monomer has an intrinsic ATRP equilibrium constant based on the system's activating and deactivating species that requires optimization to maintain polymerization control. A monomer's ability to stabilize radicals through resonance and inductive effects increases its equilibrium constant. However, since a monomer is typically chosen based on structure or functional groups, it may be necessary to change other components of the system to maintain control.

An initiator dictates the number of polymer chains in an ATRP system based on the initial ratio of monomer to initiator ($[M]_0:[R-X]_0$). From this ratio, the theoretical molecular weight or degree of polymerization (DP) can be determined by:

$$DP = \frac{[M]_0}{[R-X]_0} \times (\text{conversion}), \qquad \text{Eq. 3}$$

where molecular weights increase linearly with conversion. To maintain control over polymerization and maintain a narrow range of molecular weights, initiation is fast to ensure consistency in the number of propagating chains. Initiators have a direct effect on the ATRP equilibrium constant, $K_{ATRP}$, based mostly on the leaving atom (halide) and initiator structure. The initiator effect on $K_{ATRP}$ is largely defined by the product of the equilibrium constants for homolytic bond dissociation of the initiator and the formation of the deactivating catalyst species (halidophilicity).

Another component in ATRP systems is the catalyst system, which can be thought of as a halogen transfer vehicle. Without this transition, metal catalyst radicals would not be formed, and controlled radical polymerization may not be achieved. While the rate of polymerization, Rp, is directly proportional to the concentration of the catalyst, there is no effect on the polymer's molecular weight. The catalyst controls activation and deactivation of growing polymer chains, therefore the ATRP equilibrium is directly linked to the catalyst system employed. Equilibrium constants too low can slow or stop polymerization, and too high can lead to increased polydispersity and a poorly controlled polymerization. ATRP catalysts are comprised of a transition metal center complexed with a stabilizing ligand.

A variety of transition metals have been successfully used for ATRP, such as nickel, ruthenium, aluminum, iron, and copper, however; copper is the most widely used in ATRP catalyst systems and will be the focus in the examples herein. The two oxidation states of the copper catalyst serve complimentary purposes; the copper (I) complex creates active oligomer chains through abstraction of the halogen atom from the dormant species and allowing propagation, subsequently the copper (II) complex deactivates oligomer chains through back-transfer of a halogen atom after the addition of a small number of monomer units promoting a well-controlled polymerization. This dynamic relationship between active and dormant chains intrinsic to the catalyst system being used can maintain polymerization control.

Choosing the correct ligand can provide the desired ATRP equilibrium constant. While the monomer and initiator both have significant effects on $K_{ATRP}$, they are typically predetermined based on desired polymer structure. However, the ligand can be adjusted to obtain an optimal equilibrium constant. The ligand in an ATRP catalyst complex serves to solubilize transition metal salts, to increase the reactivity of the metal center through electron donation, and to stabilize the catalyst complex. Nitrogen-based polydentate ligands were determined to be the most activating ligands for copper-based ATRP, and they control the equilibrium position through both electronic and steric mechanisms. The steric effect comes by reducing the rate of activation of the catalyst system, by making it more difficult for the halogen atom to interact with the metal center. The more prominent factor affecting catalyst activity is from stabilizing the deactivating ($Cu^{II}$) catalyst species via electron donation by the ligand Another factor relating to the catalyst is the choice of the starting halide salt; this factor is based on the relative bond strength of the carbon-halogen and copper-halogen bonds that a repeatedly formed and broken during ATRP. C/Cu—X bonds are typically weaker in bromine (Br) ATRP, allowing for a more efficient polymerization that can be conducted at lower temperatures.

ATRP can be conducted on neat monomer or within a solvent. Solvents may be necessary due to solubility issues; either the polymer is not soluble in its monomer, or the monomer being polymerized is solid at reaction temperatures. Aprotic solvents, solvents that do not contain O—H or N—H groups that would allow hydrogen bonding, are primarily used for ATRP. More recently, aqueous/protic solvent systems are used to synthesize water soluble polymers, or to move away from traditional ATRP solvents that may be volatile or hazardous. Water is safe, inexpensive, and environmentally benign.

Figure 12:
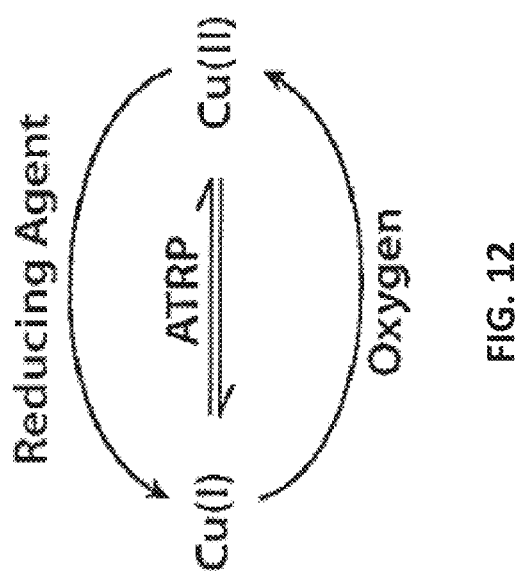
FIG. 12 is a simplified schematic illustration of an Activators Re-Generated by Electron Transfer (ARGET) polymerization mechanism that forms separation media described herein.

Activators Re-Generated by Electron Transfer (ARGET) is the mechanism used to reduce copper concentrations in ATRP. ARGET ATRP relies on the same basic mechanism as traditional ATRP, but allows copper concentrations to be lowered to the parts per million levels through the use of an environmentally benign reducing agent, the simplified reaction kinetics are depicted in FIG. 12.

ARGET ATRP employs a reducing agent to continuously produce "activators" ($Cu^I$ from $Cu^{II}$), thus, not only does ARGET lower the catalyst concentration to part per million levels (with respect to monomer), but it also practically eliminates the need for catalyst removal upon reaction completion. The rate of polymerization also governs ARGET ATRP as the rate depends on the ratio of $[Cu^I]$ to $[Cu^{II}]$ and not the actual concentrations of each. While the rate of the reaction maintains the same in comparison to traditional ATRP, greater control can be achieved as many of the side reactions that limit molecular weight are inherently minimized with the lower catalyst concentration via ARGET ATRP.

ATRP is a versatile polymerization mechanism that allows a great degree of tunability depending on the system being used. Parameters can be optimized according to the desired degree of polymerization and reaction time while maintaining control of polymerization. In this way, oligomers of desired length can be produced. ARGET ATRP as used herein provided a significant improvement over traditional ATRP by drastically lowering the catalyst concentration without altering polymerization rates or sacrificing control. This advancement makes ATRP a much more environmentally friendly process that can also be conducted in the presence of limited amounts of $O_2$ also making it a viable industry technique.

Once oligomer synthesis was complete, the same mechanism for propagation was used to covalently attach the ionic oligomer (e.g., the synthesized AER) to individual grains of the separation medium thereby forming the separation medium. The adaptability of this method allowed for a simple, one-pot synthesis of the ionic species that is covalently bonded to separation medium described herein.

Example 2

Aqueous Synthesis of Separation Medium

For the removal of NOM, PFAS, and/or other fluorinated compounds, a Type I SBA with a quaternary ammonium functional group (oligo(vbTMAC)) was synthesized using traditional ATRP and ARGET ATRP described in Example 1 in both N,N-dimethylformamide (DMF) and water. The synthesized AER was then covalently attached to silica present on the surface of a silica-containing granular support, or a surface thereof, which provided a scaffold for the resin. Without scaffolding, the polymer would free in solution with no way to remove or regenerate the materials for water treatment.

The silica-containing granular support was functionalized with the AER via the same mechanism used for ATRA/ATRP; however, instead of propagating through addition to an alkene on a vinylic monomer, polymers of a pre-determined length were added when an active oligomer chain reacts with a double bond on the surface of the silica-containing granular support, functionalizing the granular support with the polymer chain. The functionalized granular support forms the novel and advantageous separation medium described herein, which can then be incorporated on or in devices for filtering contaminants from liquids, including but not limited to water.

AERs can be synthesized using both traditional ATRP and ARGET ATRP, in DMF and water. This allows for a predetermined degree of polymerization before adding the granular support so as to control polymer length, as well as the ability to complete the entire synthesis in a single reaction flask as schematically illustrated in FIGS. 2 and 13.

Figure 13:
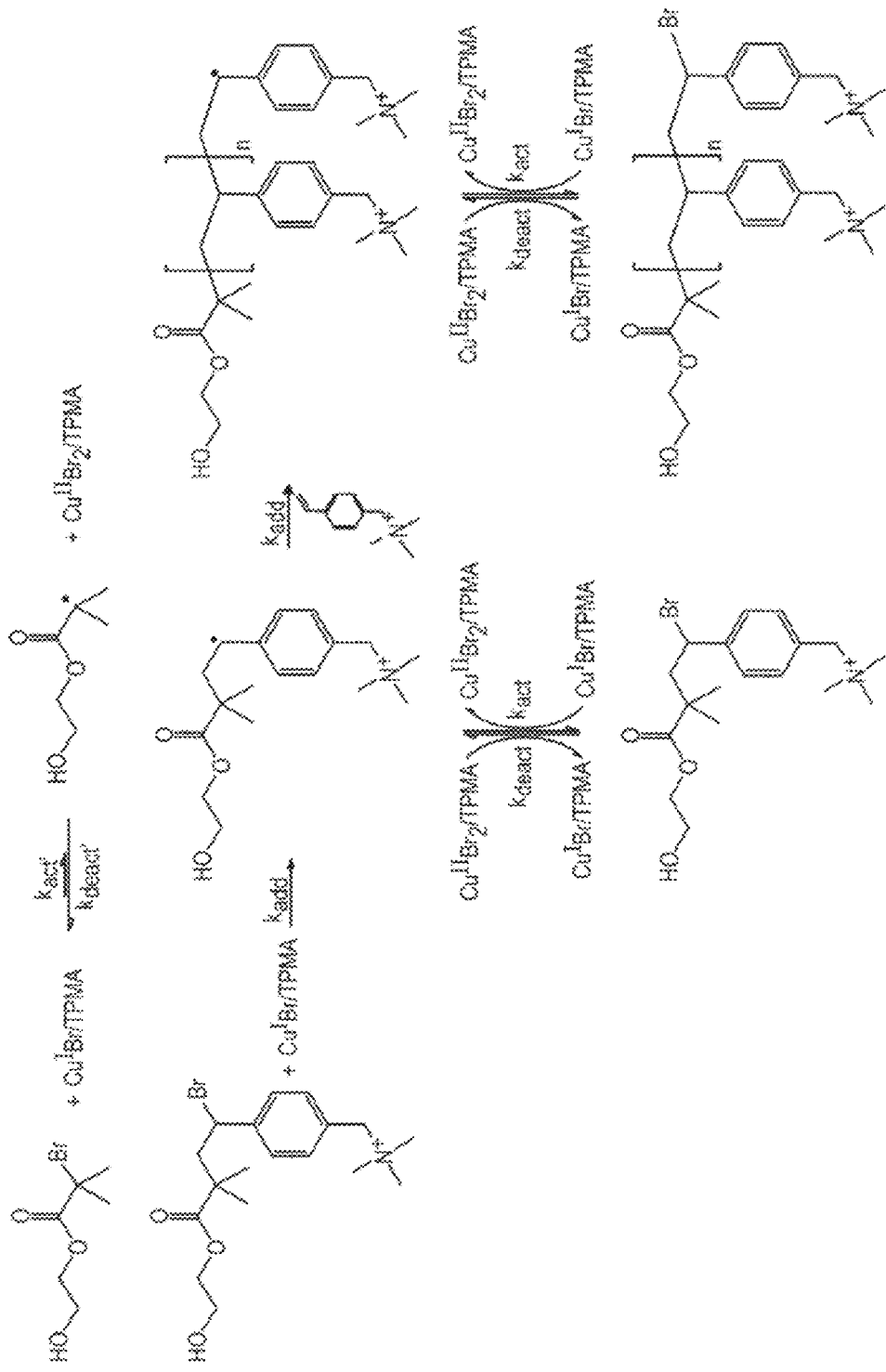
FIG. 13 schematically illustrates an exemplary polymerization mechanism for forming of a separation media described herein.

As shown in FIG. 13, an aqueous synthesis of the separation medium would produce very low hazardous waste and offer simple purification steps. FIG. 13 describes an aqueous ARGET ATRP syntheses that employs a HEBiB/$CuBr_2$/TPMA initiating system and utilizes ascorbic acid as the reducing agent (i.e., where HEBiB is 2-hydoxyethyl 2-bromoisobutyrate as shown in FIG. 3A; and TMPA is tris(2-pyridylmethyl)amine). Polymerization was performed under ideal ARGET ATRP conditions. All solutions were purged with Ar for fifteen minutes before use. In a dry flask, under argon, vbTMAC (1.99 g, 9.40 mmol) was dissolved in water (4.00 mL), where vbTMAC is vinylbenzyl trimethylammonium chloride. The resulting mixture was stirred until fully dissolved. $CuBr_2$ (0.940 µmol) and TPMA (42.3 µmol) in water (2.350 mL) was added, followed by the addition of HEBiB (13.7 µL, 94.5 µmol). The reaction flask was then placed into a 90° C. bath of oil before adding 37.6 µmol of L-ascorbic acid (AA) to initiate the reaction. Polymerization was allowed to proceed for 30 minutes via the reaction scheme depicted in FIG. 13.

In another embodiment, the ARGET ATRP synthesis employs a different catalyst system other than $CuBr_2$/TPMA, specifically selenium 2-ethylhexanoate, as shown for example in FIG. 3B. In this system, the synthesis is nearly identical to that shown in FIG. 13, with the exception that the copper catalyst has been replaced with the selenium 2-ethylhexanoate.

Granular support surface silica functionalization, using zeolite as an example, was accomplished by adding 50 g of zeolite having an average particle size of 500 µm and a solution of tolune comprising 1.0 g of chloro(dimethyl) vinylsilane. The particles are rinse with methanol then water to remove unreacted silane. The particles are dries in vacuum to remove water and methanol. The catalyst complex and reducing agent and the prepared activated oligomeric chains were then added to the functionalized zeolite in water. The zeolite was functionalized under reflux, without stirring, for 2 h to 3 days.

Particles were then recovered by filtration through a mesh. Unbound polymer and reactants were rinsed away with brine (4-8 M aqueous NaCl or $MgCl_2$) and then the particles were purified by soxhlet extraction in water until all unbound polymer and salt is removed.

Removing all non-covalently attached oligomers from the mixture is needed since free polymer would increase the apparent adsorption characteristics of the resin. Without addition of granular support (i.e., no covalent attachment), the non-covalently attached polymer strands are easily filtered and removed from the sample as the polymer is completely soluble in water.

Example 3

Comparison of Separation Medium to Known AERs

Coagulation is ineffective at removing low molecular weight NOM. Experimental data suggested that only about 5% of low molecular weight compounds can be removed from drinking water via coagulation. Adsorption is thought to be superior to coagulation.

Sodium fluorescein (NaFl) is a low molecular weight species that was used as a NOM surrogate for use in obtaining adsorption data. NaFl was chosen as a surrogate molecule for NOM due to structural similarities to fulvic acids and its strong absorbance in the visible region, specifically at 491 nm ("$A_{491}$").

Figure 14:
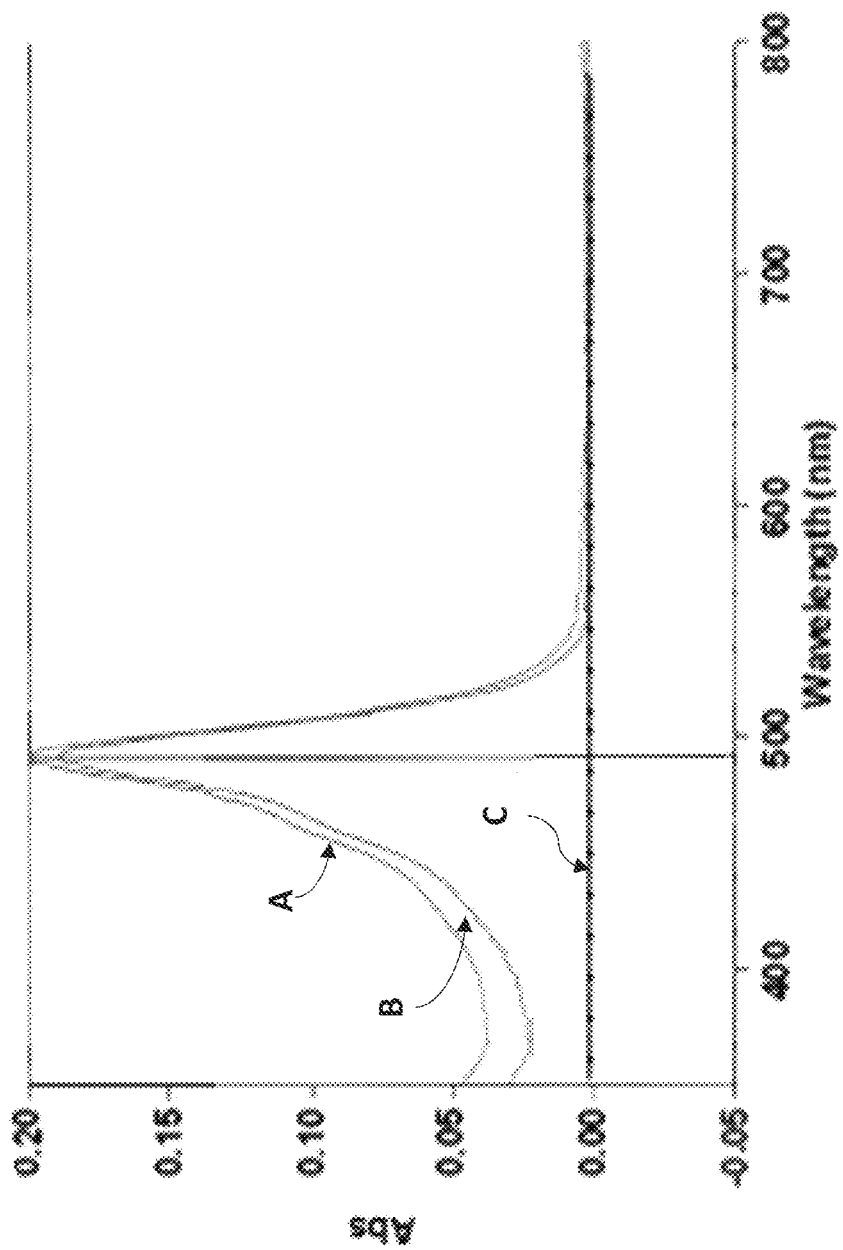
FIG. 14 is a graphical illustration of the absorption of NOM surrogates by separation media described herein.

FIG. 14 graphically illustrates NaFl NOM surrogate removal by zeolite grains functionalized with oligomeric chains described in Example 2, compared to unfunctionalized zeolite grains (zeolite grains without any of the oligomeric chains covalently bound). Specifically, NaFl has been dissolved in water at a concentration of 2.23 mg-C/L. Plot A represents a control where only NaFl is present in the aqueous solution. As shown, after 30 min incubation period, the NaFl control showed an $A_{491}$ of 0.199, corresponding to the concentration of 2.23 mg-C/L of NaFl remaining unabsorbed in solution. Plot B represents a solution where unfunctionalized zeolite has been added to the NaFl solution. After incubation for 30 min, the $A_{491}$ absorbance was 0.188, corresponding to a concentration of 2.10 mg-C/L, representing a measurable, but statistically insignificant reduction in the amount of NaFl present in the solution. Plot C represents a solution where zeolite grains have been functionalized with the oligomeric chains described in Example 2. As shown, the $A_{491}$ absorbance was 0.0035, corresponding to 0.039 mg-C/L.

Consequently, FIG. 14 shows that unfunctionalized zeolite has a negligible effect on NaFl absorption. In contrast, functionalized zeolite effectively removed nearly all of the NaFl in the solution, demonstrating zeolite functionalized according to embodiments described herein can effectively remove NOM and reduce NOM concentrations to nearly undetectable levels.

Example 4

Regeneration and Reuse of Separation medium

FIG. 9 illustrates NOM loading or adsorption as a function of regeneration cycle of the Separation medium. A brine solution of 10% aqueous NaCl was used to desorb NOM from the Separation medium for 4 cycles, and adsorption was measured for each cycle. Excess brine was rinsed away with milli-Q water until conductivity measurements showed no residual NaCl, before adding the surrogate low MW NOM. After five minute incubation with the media, the specific adsorption qe was measured. The sample media was then regenerated with brine and the experiment repeated. It was found that through 4 adsorption/regeneration cycles at neutral pH, the separation medium film maintained the same adsorption capacity without perceptible degradation, as shown in FIG. 9. Thus, separation medium materials herein are advantageous in that the materials can be regenerated and reused multiple times, proving to be a sustainable water purification and filtration material.

Using a surrogate (NaFl) NOM concentration of 2.28 mg-C/L, it was found that the film could effectively adsorb the surrogate, and just as efficiently desorb it in a brine solution. This demonstrates that the ionic polymer/functionalized silica-containing granular support described herein can be regenerated and reused for continued NOM removal. In contrast, subject of DOWEX® resin beads to the regenerative brine treatment resulted in fracturing and degradation after regeneration in brine, and cannot be considered a sustainable water purification material.

Various embodiments of this disclosure have been described in fulfillment of the various objectives of the invention. It should be recognized that these embodiments are merely illustrative of the principles of the present subject matter. Numerous modifications and adaptations thereof will be readily apparent to those skilled in the art without departing from the instant disclosure.

The invention claimed is:

1. A system comprising:
a separation medium for water purification including a silica-containing granular support, and an oligomeric or polymeric stationary phase coupled to individual grains of the silica-containing granular support, the oligomeric or polymeric stationary phase comprising oligomeric chains or polymeric chains covalently bound to the individual grains of the granular support, wherein the oligomeric chains or polymeric chains are covalently bound to silica moieties throughout bulk regions of the individual grains.

2. The system of claim 1, wherein the oligomeric chains or polymeric chains are not cross-linked.

3. The system of claim 1, wherein the oligomeric chains or polymeric chains include one or more cationic moieties for anion exchange.

4. The system of claim 3, wherein the cationic moieties comprise quaternary ammonium groups.

5. The system of claim 1, wherein the individual grains of the granular support comprise mesopores, micropores, or combinations thereof.

6. The system of claim 1, wherein the individual grains have an average size range of 50 microns to 5,000 microns.

7. The system of claim 1, wherein the oligomeric chains or polymeric chains are bound to the silica moieties directly via alkylene linkages.

8. The system of claim 1, wherein the silica-containing granular support comprises sand, ceramic, glass, or any combination thereof.

9. The system of claim 1, wherein the separation medium is chemically regenerable and reusable.

10. The system of claim 1, further comprising a separation medium regenerant, the regenerant comprising an acid, base, or salt solution.

11. The system of claim 10, wherein contaminant species are removed from the separation medium through displacement with the regenerant.

12. The system of claim 1, wherein the separation medium can remove at least one of perfluoroalkyl substances, natural organic matter, perfluorinated acids, halogenated compounds, and fluorinated compounds from water in contact with the separation medium.

13. The system of claim 1, wherein the silica-containing granular support comprises sand, ceramic, glass, or any combination thereof.

14. A system comprising:
a separation medium for water purification including a silica-containing granular support, and an oligomeric or polymeric stationary phase coupled to individual grains of the silica-containing granular support, the oligomeric or polymeric stationary phase comprising oligomeric chains or polymeric chains covalently bound directly to silica moieties of the individual grains via alkylene linkages.

15. The system of claim 14, wherein the oligomeric chains or polymeric chains are not cross-linked.

16. The system of claim 14, wherein the oligomeric chains or polymeric chains include one or more cationic moieties for anion exchange.

17. The system of claim 16, wherein the cationic moieties comprise quaternary ammonium groups.

18. The system of claim 14, wherein the individual grains of the granular support comprise mesopores, micropores, or combinations thereof.

19. The system of claim 14, wherein the individual grains have an average size range of 50 microns to 5,000 microns.

* * * * *